Inventors
Winthrop L. Perry
Joseph E. Ring
by Roberts, Cushman & Grover
att'ys.

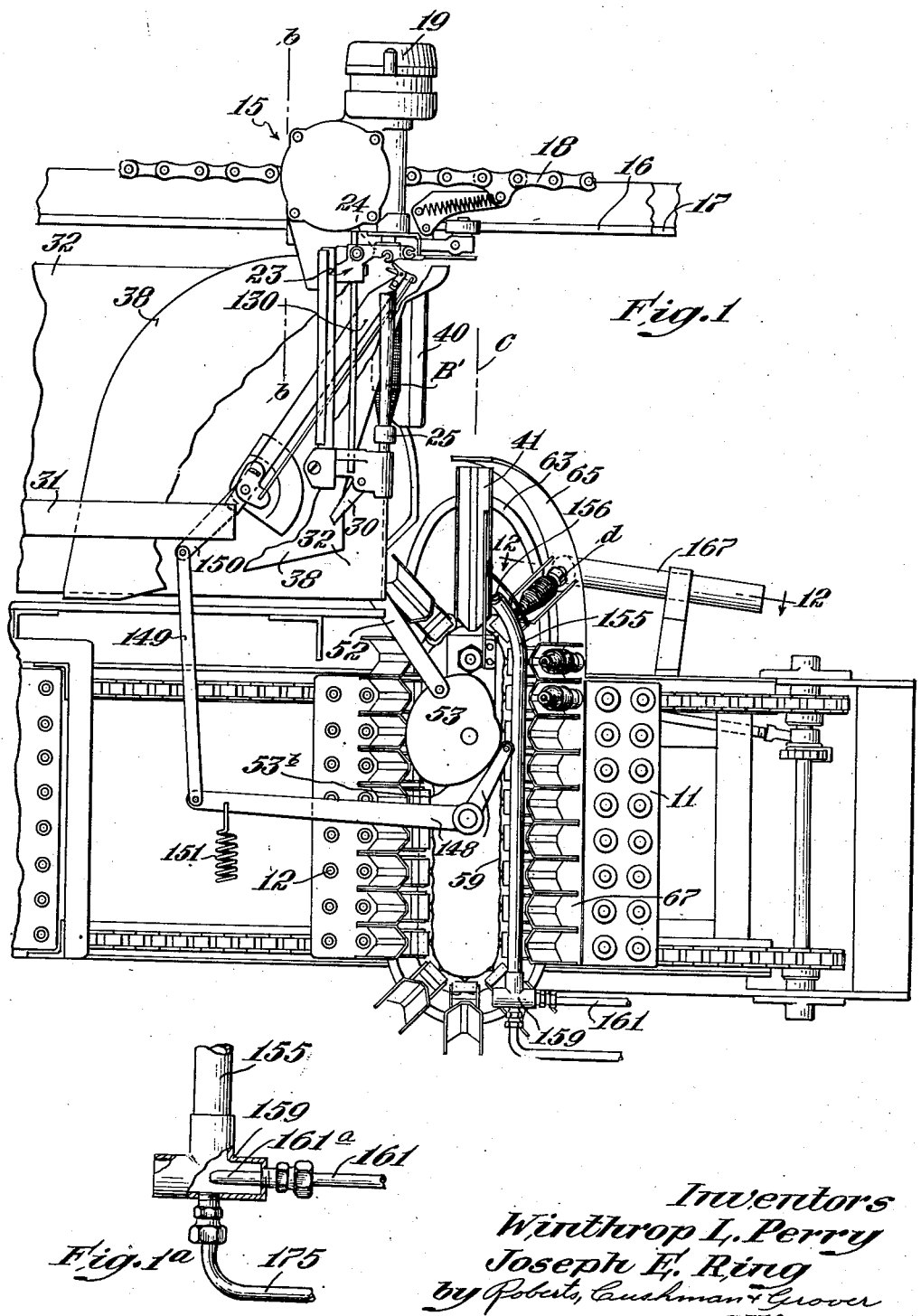

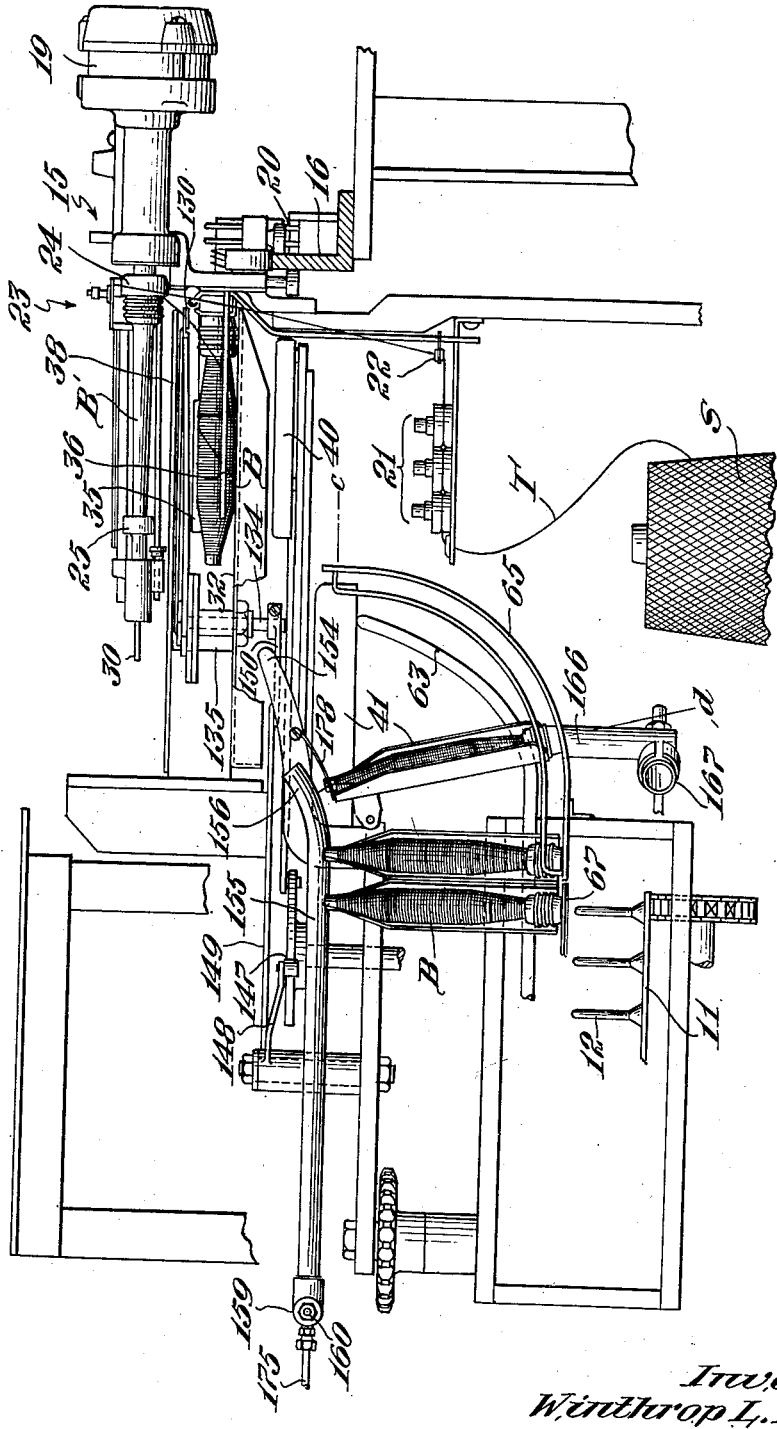

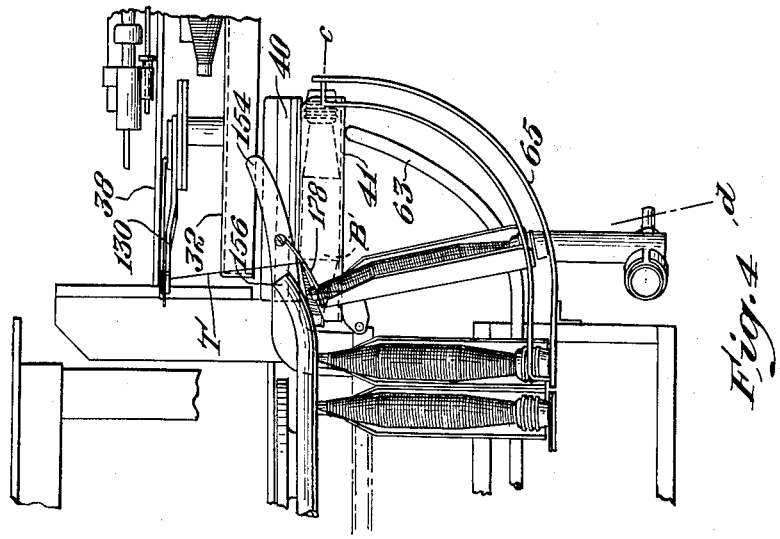
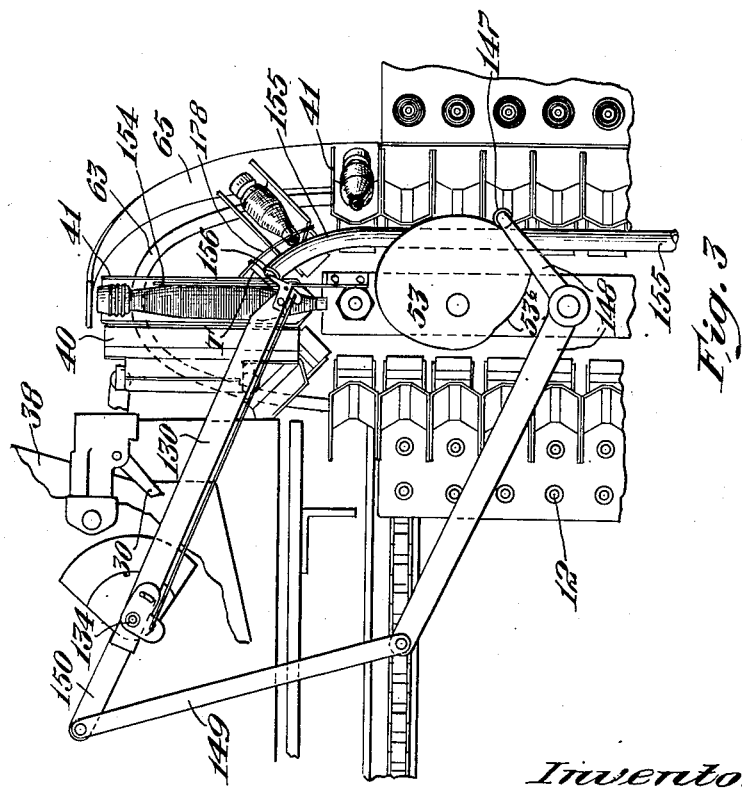

Feb. 23, 1954 W. L. PERRY ET AL 2,670,150
BOBBIN HANDLING MECHANISM
Filed June 18, 1951 8 Sheets-Sheet 5

Inventors
Winthrop L. Perry
Joseph E. Ring
by Roberts, Cushman & Grover
att'ys.

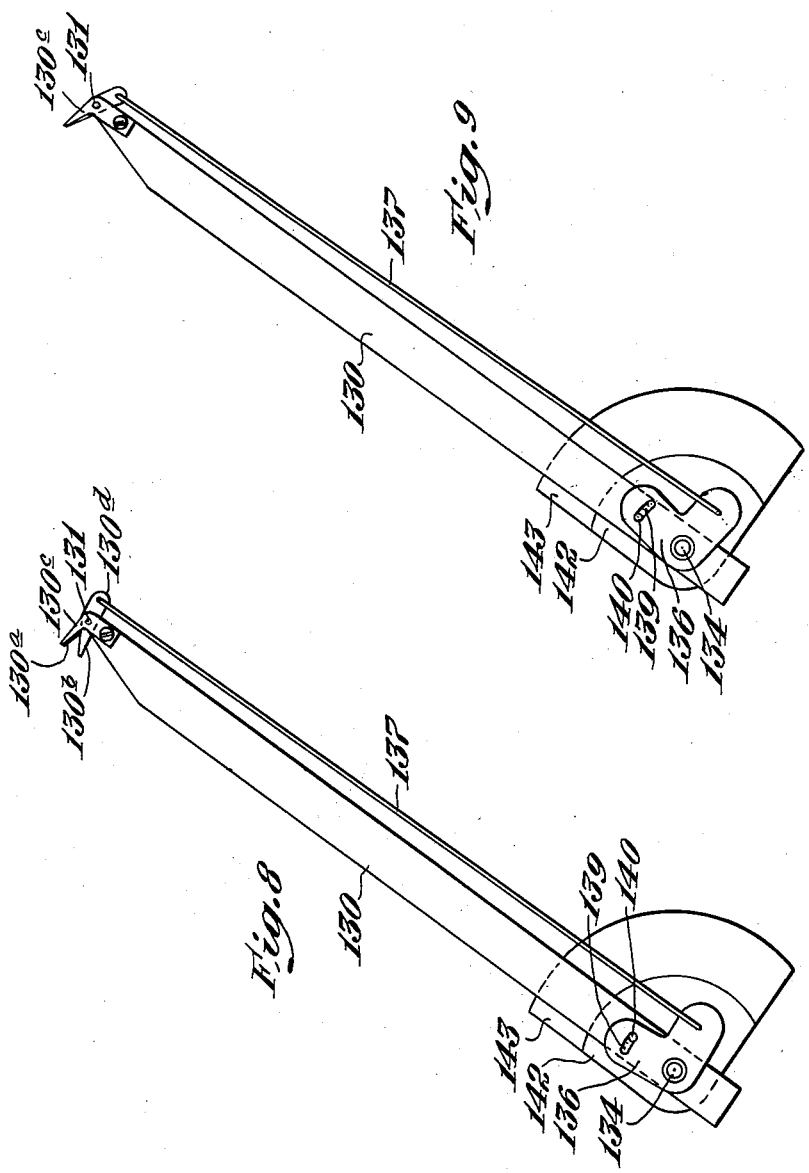

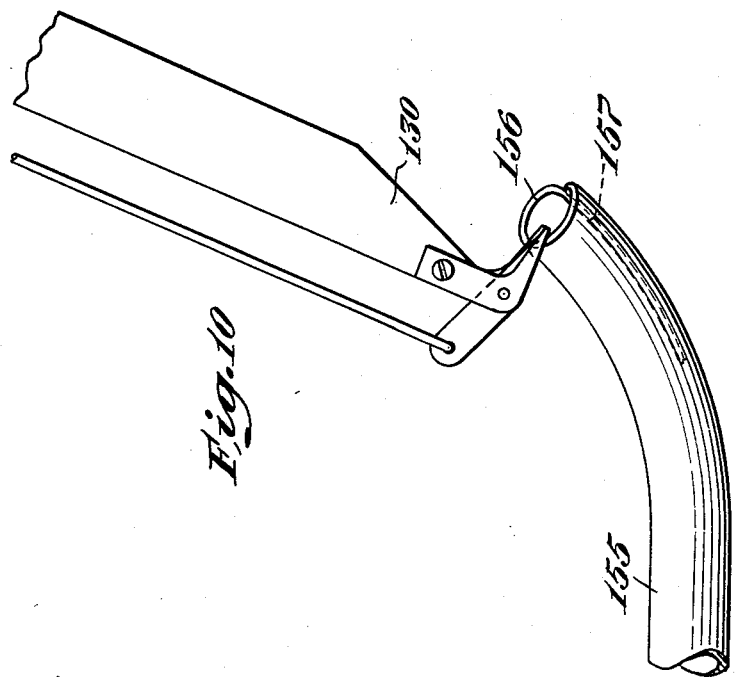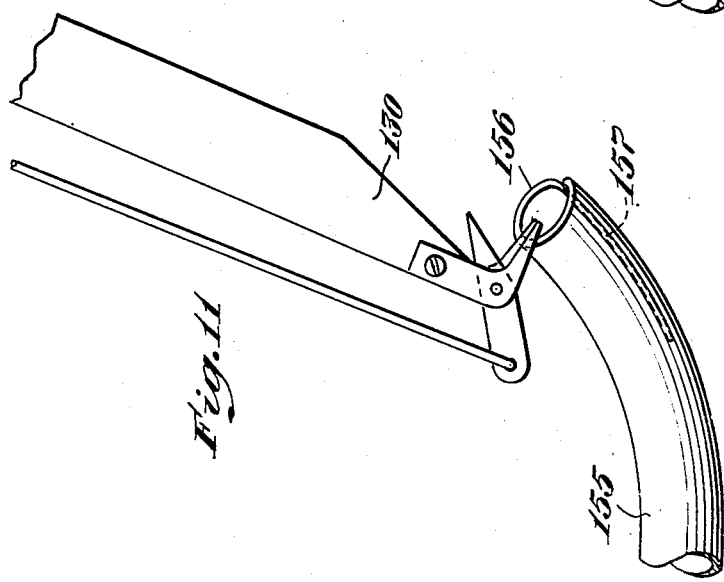

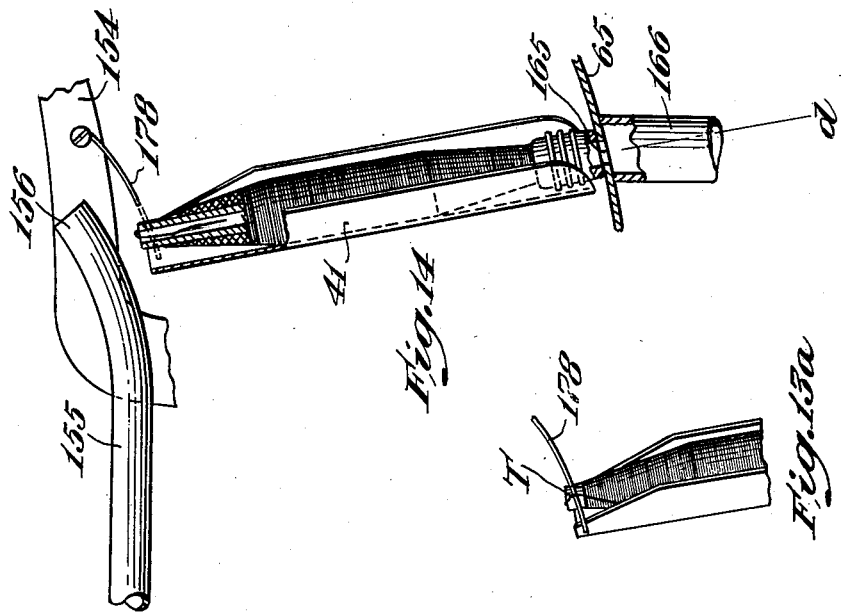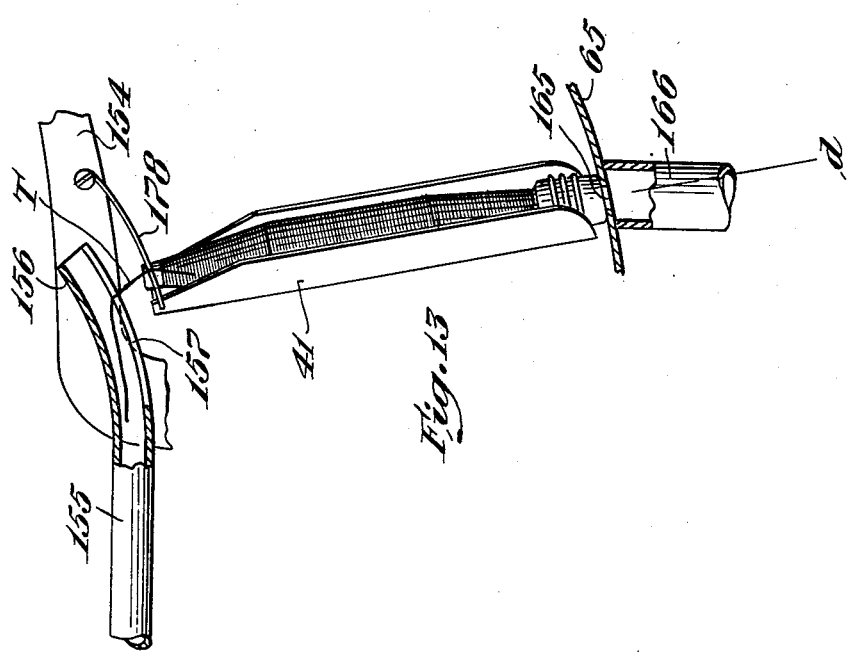

Patented Feb. 23, 1954

2,670,150

UNITED STATES PATENT OFFICE 2,670,150

BOBBIN HANDLING MECHANISM

Winthrop L. Perry, Milford, and Joseph E. Ring, Wilton, N. H., assignors to Abbott Machine Co., Inc., Wilton, N. H., a corporation of New Hampshire Application June 18, 1951, Serial No. 232,218

33 Claims. (Cl. 242—35.6)

1

This invention relates to bobbin handling mechanism for textile machines and has for its principal object to provide improved mechanism for inserting an end of thread into the interior of a bobbin through the opening in the tip of the bobbin. As is well known, textile bobbins, particularly those used in shuttles of looms, are quite generally hollow, having a central longitudinal passage from end to end.

British patent specification No. 10,033 of 1911 proposed having the leading, or first to be withdrawn, end of thread contained within the interior of its bobbin, and proposed to draw this end of thread out automatically by suction at the loom, for automatically threading the thread into the shuttle of the loom.

British patent specification No. 5,176 of 1911 proposed inserting the end of thread into the interior of a bobbin by winding extra coils of thread beyond the end of the bobbin, upon the spindle, and then withdrawing the bobbin off from the spindle so that these extra coils would enter the bore of the bobbin. This same British patent specification also suggested that instead of the thread being coiled, it might be drawn through the passage in the bobbin by any suitable means, for instance, by tweezers, a piece of suitably bent wire or the like.

The present invention aims to provide mechanism which will insert an end of thread into the interior of a bobbin in an automatic and expeditious manner, and, more specifically, to provide mechanism which will perform this automatic operation while the bobbin is in the course of being transferred away from its winding position, as to a portable bobbin holder such as a pinboard.

The invention is not limited in usefulness to cases where the end of thread, inserted in the bobbin, is to be automatically removed at the loom. Even in cases where the end of thread is to be removed manually, it is a considerable advantage to have this end of thread contained within the bobbin, when this can be accomplished automatically and in a simple manner as in the present invention. The position of the end of thread is definitely known, the end of thread is prevented from tangling, and the tendency of the outer coils of the wound thread to slough is reduced.

The invention is deemed to be capable of being incorporated in machines that wind yarn onto bobbins, whether these machines constitute spinning or twisting machines or purely winding machines. Thus for example the principle of the

2 invention is deemed applicable to a spinning frame of the automatic doffing type. The invention will be explained in its preferred form as applied to an automatic filling bobbin winder, equipped with a pinboard attachment, such as shown in the United States patent application of Edward J. Abbott and Winthrop L. Perry, Serial No. 44,754, filed August 17, 1948.

Other objects and advantages of the invention will be apparent from this specification and its accompanying drawings in which the invention is explained by a description of a preferred example thereof.

In the accompanying drawings,

Fig. 1 is a plan view with some of the parts omitted and some of the parts broken away showing a portion of a traveling spindle filling winder equipped with a pinboard attachment and having the present invention applied thereto;

Fig. 1ª is a fragmentary plan view, partly broken away, of an air connection of the apparatus of Fig. 1, but to a larger scale;

Fig. 2 is a view taken from the right of Fig. 1, partly in elevation and partly in vertical section;

Fig. 3 is a fragmentary plan view showing certain movable parts of the apparatus at approximately their mid-cycle positions;

Fig. 4 is a view similar to Fig. 2 corresponding to the positions of parts shown in Fig. 3;

Figure 7:
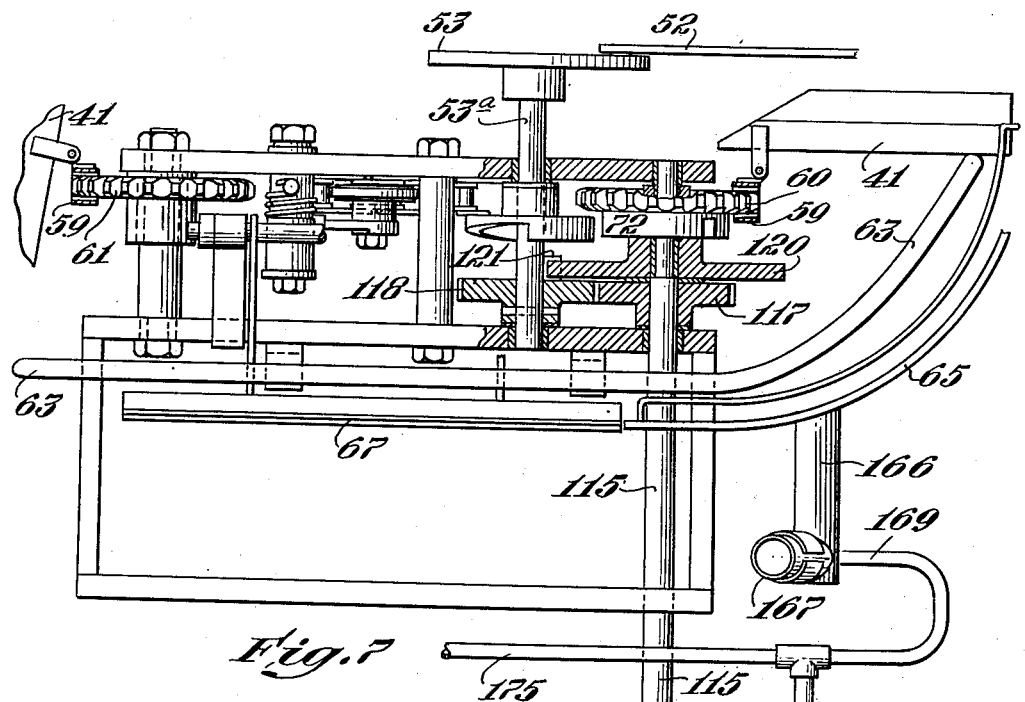
Fig. 7 is a view from the same direction as in Fig. 2, with many parts broken away or removed showing particularly the driving mechanism for the cradle and package carriers of the pinboard attachment, together with certain additional parts employed in connection with the present invention.
Figure 7A:
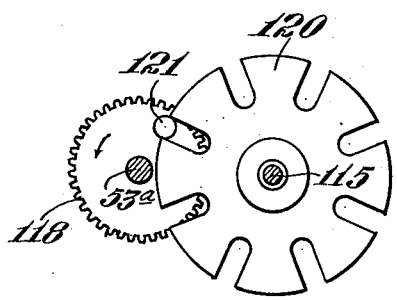
Figure 12:
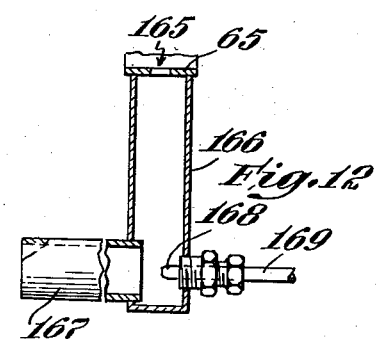

Fig. 7ª is a detail, mainly in plan, showing a Geneva movement in the driving mechanism for the package carriers of the pinboard attachment;

Fig. 8 is a fragmentary plan view showing the movable thread cutter, open and in position to receive the thread;

Fig. 9 is a view similar to Fig. 8 showing the movable thread cutter as closed;

Fig. 10 is a fragmentary plan view showing the movable thread cutter at its extreme position, adjacent to a suction tube adapted to receive the thread;

Fig. 11 is a view similar to Fig. 10 showing the movable thread cutter as having opened to release the thread to the suction tube;

Fig. 12 is a sectional view taken on the line 12—12 of Fig. 1;

Fig. 13 is a diagrammatic view from the same point of view as Fig. 2 showing a wound bobbin in position for its leading end of thread to be drawn into the opening in the tip of the bobbin;

Fig. 13a is a fragmentary view similar to Fig. 13, showing the thread as having been drawn into the opening in the tip of the bobbin, and Fig. 14 is a view similar to Fig. 13, and like Fig. 13a shows the thread as having been drawn into the opening in the tip of the bobbin, the bobbin here being partly broken away to show portions of its longitudinal passage.

The traveling spindle filling bobbin winder of which a portion is shown in Figs. 1 and 2 may include many of the features of United States Reissue Patent No. 22,492 and Patents Nos. 2,362,455, 2,377,367, 2,395,028, 2,426,167 and 2,426,168. Thus the winder may include a plurality of winding units indicated generally at 15 movable around an endless track consisting of upper and lower stationary rails 16 and 17 by means of an endless chain 18 (Fig. 1). Each winding unit may be individually driven by its own electric motor 19 deriving its current through the frame of the machine and through suitable brushes contacting with stationary conductor bars 20, so as to wind an individual bobbin as the winding unit travels around the machine.

Yarn or thread T from a supply S carried by the unit may be drawn upwardly through suitable tension devices 21 and through a breakage detector 22 to a traversing thread guide assembly indicated generally at 23, and thence onto a winding bobbin held between inner and outer centers 24 and 25.

The inner center 24 is rotated by the motor 19 to rotate the bobbin. The thread guide assembly 23 is reciprocated by suitable cam and linkage connections also driven by the motor, and, during the winding, the thread guide assembly is progressively advanced from the base of the bobbin toward the tip, to provide the typical filling wind.

Upon the completion of winding of a bobbin on the traveling unit, the individual motor of the unit is deenergized and rotation of the bobbin is stopped by breaking the circuit to the motor, for instance by lifting of the unit's brushes from the conductor bars 20. This action should normally occur because of completion of winding of the bobbin somewhat before the winding unit reaches the apparatus shown in Fig. 1. Preferably the machine is provided with a known form of mechanism which will deenergize the individual motor at such place in any event, whether or not the bobbin has been completely wound. It will therefore be understood that the winding units enter the apparatus shown in Fig. 1, in an inactive condition but still holding the wound bobbin in winding position between the centers 24 and 25.

The outer center 25 of each unit is retractable to discharge the wound package from winding position by means of a crank arm 30 on the winding unit and a stationary abutment 31 diagrammatically indicated in Fig. 1. Upon the crank arm 30 encountering the abutment 31, the wound bobbin will drop from the centers a short distance onto a horizontal stationary plow plate 32 which extends along the path of travel of the winding units 15, underneath their head portions. The bobbin is rolled along this plate by being held between a vertical plate 35 and a rod 36 (Fig. 2) both of which extend from and move along with the winding unit.

When the crank 30 leaves the right end of abutment 31 in Fig. 1, the outer center 25 is allowed to close upon a new empty bobbin appropriately held by suitable bobbin-feeding mechanism located in this region, the bobbin-feeding mechanism being omitted from these drawings for clarity of illustration but a line b—b in Fig. 1 indicating the center line at which a new empty bobbin is held by the bobbin-feeding mechanism. In Fig. 2 a new empty bobbin B' is shown as having been received between the centers 24 and 25, in winding position, and above the discharged full bobbin B which is being rolled along on the plate 32.

As in commercial machines embodying the inventions of the above patents, the thread guide assembly 23 is returned to a position above and adjacent to the base center 24, being so shown in Fig. 1. This return of the thread guide assembly coupled with the action of an upper plow plate 38 disposes across the center 24 a run of the thread which extends from the wound bobbin upon the lower plow plate 32 to the thread guide assembly 23. When the new empty bobbin B' is received between the centers as above described, this run of thread is clamped between the base end of the new bobbin and the center 24.

Instead of the thread guide being located above the winding position, the thread guide may be located below the winding position as in the United States patent application of Winthrop L. Perry, Serial No. 154,553, filed April 7, 1950, now Patent No. 2,630,275 of March 3, 1953, and the thread may be positioned across the base center 24 by the mechanism shown in that application.

In either case, at this stage, the present machine departs from the mode of operation of the machines of these previous applications and patents by not letting go of the cut end of thread of the wound bobbin when this is severed from the thread extending to the supply. Instead, as hereinafter explained, the present machine upon cutting the wound bobbin free, holds the end of thread which is attached to the wound bobbin and carries this end into position for automatic insertion into the opening in the tip of the wound bobbin. This action as will be seen below is coordinated to the transfer of the wound bobbin to a portable bobbin holder such as a pinboard, so that such bobbin holder when filled presents an array of systematically arranged filling wound bobbins each with its leading end inserted in the opening in the tip of the bobbin.

The pinboards, each comprising a flat bottom 11 carrying ten rows of eight pins 12, are moved step by step from left to right in Fig. 1 by traveling chains as described in said application Serial No. 44,754.

The pinboard mechanism of application Serial No. 44,754 includes mechanism for moving the wound bobbins one by one out from beneath the winding units, mechanism for grouping the bobbins in a group corresponding to the pins of a row on the pinboard, typically eight pins, mechanism for discharging the bobbins of the group onto the pins of a row, and mechanism for advancing the pinboard step by step to receive successive such groups. The bobbin-discharging mechanism and the pinboard-advancing mechanism will not here be described in detail but reference may be had to said application Serial No. 44,754. However the mechanism for moving the bobbins out from beneath the winding units, and the mechanism for grouping the bobbins in a group will be described in some detail because they here participate in the additional operation of inserting the end of thread into the opening in the tip of the bobbin.

Figure 5:
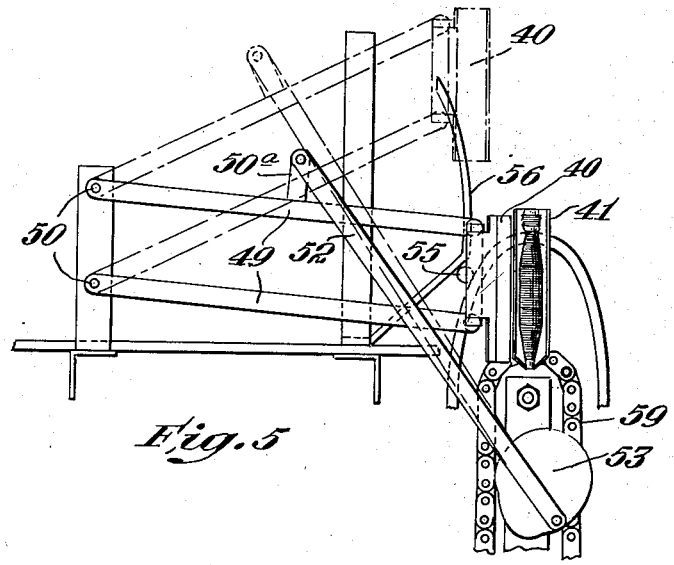
Fig. 5 is a schematic diagram in the nature of a plan view showing the cradle and one of the package carriers of the pinboard attachment.
Figure 6:
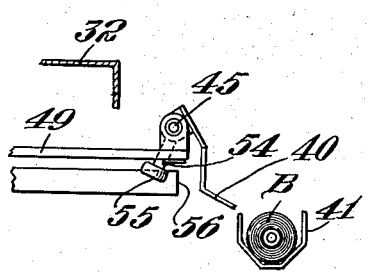
Fig. 6 is a fragmentary view in the nature of a vertical section, with various parts omitted, showing the wound bobbin having been rolled from the cradle into a horizontally disposed package carrier of the pinboard attachment.

Thus as in application Serial No. 44,754 a cradle 40 is mounted to tilt on a cross rod 45, Fig. 6, carried by parallel links 49 which are pivotally mounted at 50 upon a stationary part of the machine. An extension 50a extending from one of the links 50 is connected by a link 52 to a crank disk 53 which is intermittently rotated, as subsequently described, to carry the cradle from its broken line position of Fig. 5 to its full line position and back to such broken line position in one revolution of the crank disk.

The cradle carries a downwardly extending arm 54 carrying a roller 55 adapted to roll along a guide surface 56 to determine the inclination of the cradle. At the broken-line receiving position of the cradle of Fig. 5, and also throughout most of the travel of the cradle toward its discharging position, the guide surface 56, acting through roller 55, holds the cradle approximately horizontal. However, close to the discharging position shown in Fig. 6 and in full lines in Fig. 5, the guide surface 56 retreats, permitting the cradle to tilt to the inclination shown in Fig. 6 to roll the wound bobbin onto a package carrier 41. The several package carriers 41 are individually pivotally secured to an endless tractor element, shown as an endless chain 59, running on spaced sprockets 60 and 61 (Fig. 7). Sprocket 60 is driven in steps as subsequently described to advance the chain 59 in steps corresponding in length to the center-to-center spacing of the bobbin-holding pins 12 of a row on the pinboard. As shown in Fig. 3, the package carriers 41 as they occupy a straight portion of the path of the chain are closely disposed side by side, their center-to-center spacing also corresponding to the center-to-center spacing of the pins of a row.

A bar 63 having both straight and curved portions on which the outer parts of the package carriers 41 ride, is shaped to direct each package carrier into an elevated approximately horizontal position adjacent to the delivery position of the cradle 40, one such package carrier 41 being shown so elevated in each of Figs. 1, 2, 3, 4 and 7. The bar 63 is then curved to allow the package carriers to swing downwardly into an inclined but generally vertical position preparatory to passage along a straight path over and across the pinboard in this generally vertical position, this generally vertical position being adapted for endwise delivery of the wound bobbins onto the pins of the pinboard.

A stationary curved guide plate 65 (Figs. 3 and 7), adjacent to the path of the outer ends of the package carriers, retains the wound bobbin in its carrier 41 during passage from the elevated position until the carrier arrives above the pinboard. Thereafter, a gate 67 (Figs. 1, 2 and 7) retains the wound bobbin in the package carrier until the step-by-step advance of the carriers has assembled a group of eight wound bobbins over the pinboard above eight pins in a row, and the gate is opened by any suitable mechanism such as described in application Serial No. 44,754, delivering the bobbins to the corresponding pins.

Suitable driving mechanism for the crade 40 and the series of package carriers 41 may include any suitable form of one revolution clutch adapted to impart a single revolution to a main drive shaft 115 (Fig. 7). The initiation of this single revolution may be by a detection of a wound bobbin rolling onto the cradle 40 as in application Serial No. 44,754, or by detection of such wound bobbin as it is about to roll into the similar cradle, as in one form of device shown in the United States patent application of Winthrop L. Perry for Bobbin Packing Mechanism, Serial No. 204,738, filed January 6, 1951, or by passage of a winding unit, as in another form of device shown in said application Serial No. 204,738. However initiated, the single cycle of revolution of shaft 115 begins at approximately the time when a wound bobbin reaches the end of the lower plow plate 32.

A single revolution of shaft 115 acts through the crank disk 53 and link 52 to move the cradle 40 to deliver the wound bobbin to a package carrier 41 and then return the cradle to its receiving position at the end of plow plate 32. After reception of the wound bobbin by a package carrier 41 a later part of the single revolution of shaft 115 acts to advance the sprocket 60, the chain 59, and the series of package carriers 41 one step, i. e., advance the package carriers 41 the distance between adjacent pins 12 of a row on the pinboard.

Referring to Fig. 7, shaft 115 has fast thereon near its upper end a gear 117 which meshes with a gear 118 fast on a countershaft 53a carrying the crank disk 53. Above its gear 117, shaft 115 extends loosely through the sprocket 60 and its hub 72, and also loosely through the slotted gear 120 of a Geneva movement, slotted gear 120 being fast to hub 72 and sprocket 60. Gear 118 carries the pin element 121 of the Geneva movement cooperating with the slotted gear 120 to impart to the sprocket 60 and chain 59 the above described step-by-step movement.

As indicated above, the present machine, as it cuts the wound bobbin free from the thread extending to the supply, holds the end of thread which is attached to the wound bobbin and carries this end into position for automatic insertion into the opening in the tip of the wound bobbin.

A thread cutter best shown in Figs. 8 and 9 is shown as including a long arm 130 of which the right end is shaped as the lower blade 130a of the cutter. A movable middle blade 130b is pivoted to the lower blade at 131 and an upper blade 130c of spring material cooperates with the middle blade 130b to sever a thread between them when the middle blade is closed as in Fig. 9. The meeting edges of the upper and middle blades are sufficiently sharp to act as scissors, but the meeting edges of the middle and lower blades are dull and do not cut, but clamp between them and hold the thread that is cut by the upper and middle blades. Thus after the thread extending to the wound bobbin is cut, this wound end is held by the cutter.

An actuating shaft 134, Fig. 2, is rotatable in a bushing 135 mounted on the lower plow plate 32, the cutter arm 130 being rotatable about shaft 134. The upper end of shaft 134 carries fast thereon a bell crank 136, Figs. 8 and 9, of which one arm is connected by a link 137 to a tail portion 130ᵈ of the middle blade 130ᵇ. The other arm of bell crank 136 has an arcuate slot 139 to receive a pin 140 fixed in the arm 130 of the thread cutter. As a consequence, clockwise rotation of the shaft 134 in Fig. 8 first acts through the link 137 to close the movable blade 130ᵇ as shown in Fig. 9 and thereby cut and clamp the thread, and then acts through pin 140 to swing the cutter with its blades closed to the outward position of Figs. 10 and 3. To insure that the arm 130 does not move away from thread-receiving position until the blade 130ᵇ is closed, a stationary bracket 142 is provided with a facing of friction material 143 such as cork upon which the arm 130 rests. When the cutter is moved in the reverse direction, that is from outward position to thread-receiving position, the friction material 143 similarly acts to insure that the movable blade is open before the cutter starts this return movement.

The drive of the cutter through shaft 134 is preferably obtained from the same disk 53 that forms part of the mechanism for operating the tray 40, by developing the lateral edge of this disk as a cam surface 53ᵇ as shown in Fig. 3. This cam surface during rotation of the disk acts through a follower 147 upon a bell crank 148 and thence through a link 149 and crank arm 150 to rotate the shaft 134 and cutter. A suitable spring 151 acting upon bell crank 148 maintains the follower 147 in continual contact with the cam surface 53ᵇ throughout the cycle of operation.

The shape and position of the cam surface 53ᵇ are such that the movement of the cutter from its thread-receiving position of Fig. 1 begins shortly after the cradle 40 commences to move outwardly, carrying the wound bobbin, and the cutter and cradle reach their outer positions at approximately the same time.

A suction holding tube 155 has its open end 156 curved upwardly (Fig. 2) and to the left (Fig. 3) so that this open end is located approximately beneath the outer position of the cutter. Inwardly from its end, and where it faces the path of the bobbins in the package carriers 41, the tube 155 is slotted at 157, Fig. 13, to allow travel of a held end of thread therealong away from the open end. Suction is applied to the tube 155 from any suitable source, preferably by aspiration. Thus, as shown, tube 155 terminates in a T, indicated at 159, Figs. 1 and 1ᵃ, a jet of compressed air being injected through a pipe 161 which terminates in a nozzle 161ᵃ within the T, thereby to create suction in the tube 155. In the preferred form of apparatus shown, the pipe 161 leading to nozzle 161ᵃ is in constant communication with a pipe 162, Fig. 7, connected to any suitable supply of compressed air. Provision is however made for periodically nullifying the suction effect in the suction tube 155 as subsequently described.

As the thread is carried outwardly by the cutter and the wound bobbin is carried outwardly by the cradle 40, the run of thread between the cutter and bobbin passes under a curved finger 154, Fig. 4.

When the wound bobbin is rolled from the cradle onto a package carrier 41, i. e. at approximately mid-cycle, the thread has arrived at a point close to the open end of tube 155. Just after the bobbin rolls onto the package carrier, the connections to the cutter act in a return direction, first to open the cutter and release the held end of thread, and then to return the cutter to thread-receiving position.

When the cutter releases its thread preparatory to starting its return movement, the end of thread attached to the bobbin is drawn into the suction tube 155 and there held.

One step of the shifting movement of the package carriers 41 then takes place, effected through a movement of the sprocket 60 by the Geneva movement pin 121 coming into driving engagement with the slotted gear 120. During this step the package carrier 41 containing the bobbin whose end of thread is held in tube 155 is moved from a horizontal position indicated at the line c to the inclined position indicated at the line d, Figs. 1, 4 and 13 at which position the base end of the bobbin rests upon the curved guide plate 65. The package carriers stop with a wound bobbin aligned with this line d, due to disengagement of the Geneva movement pin 121 from the slotted gear 120 shortly before the end of a single revolution of the main shaft 115. At the end of a single revolution of the main shaft 115, the wound bobbin thus carried to the line d has its end of thread still extending into the suction tube 155, as indicated for the bobbin at line d in Figs. 2 and 13. With the bobbin at this line d, a portion of its thread is thus held outwardly beyond the tip of the bobbin, in position to be drawn into the central longitudinal passage of the bobbin at the beginning of the next cycle of operation, as subsequently described.

The guide plate 65 is provided at the line d with an orifice 165, Figs. 12 and 13, over which the central longitudinal passage of the bobbin lies, in communication with this orifice, when the bobbin is at the line d. Orifice 165 communicates through a pipe 166 with a horizontal discharge pipe 167, and a nozzle 168, Fig. 12, at the base of pipe 166 is adapted to inject a jet of compressed air from a tube 169 into the pipe 167 thus inducing suction in pipe 166 and through orifice 165 and in the longitudinal passage through the bobbin, and a resultant flow of air downwardly into the opening at the tip of the bobbin and down through its longitudinal passage.

Tube 169 is connected to the compressed air supply pipe 162 through a valve 170 which is normally closed. Valve 170 is controlled by a cam 171 on shaft 115 so as to open briefly and then close during the first few degrees of movement of shaft 115.

The same valve 170 also permits periodic flow of air to a pipe 175, Figs. 7 and 1ᵃ, adapted to admit air under pressure into the T 159 in the direction of the suction tube 155. This admission of air through pipe 175 has the effect of nullifying or overcoming the suction in tube 155, thus releasing the end of thread held therein. The current of air entering the opening in the tip of the bobbin draws this end of thread into the bobbin as shown in Fig. 14. Thereupon the valve 170 closes, stopping the injection of air through nozzle 168, thereby terminating the suction and flow of air through the interior of the bobbin, and also terminating the injection of air through the tube 175, thus allowing suction again to be built up in the tube 155.

The release of the end of thread from the suction tube 155 and the insertion of this end of thread into the central longitudinal passage of a bobbin at line d takes place, as indicated above, at the beginning of a cycle of operation, and more particularly before the time when the movable thread cutter delivers the end of thread of the next succeeding bobbin into suction tube 155.

It will be observed from Fig. 14, that each bobbin has its leading end of thread inserted into the interior of the bobbin before leaving the line d. Thus the procession of bobbins which have passed the line d in step-by-step movement into alignment with pins of the pinboard (only two of such bobbins being shown in Fig. 2) all have their leading ends of threads contained within their central longitudinal passages. When a pinboard has been filled, as by discharge of ten successive rows of eight bobbins each onto the pins 12, all bobbins on the pinboard are thus uniformly in this condition in which their leading ends of threads are in definite positions.

During passage of the bobbin in a curved path during the last part of its travel toward position d and also while at position d, a wire spring 178 carried by the finger 154 rests against the tip of the bobbin. The effect of this wire spring is to prevent any substantial amount of thread from being unwound from the bobbin by the suction in tube 155, or later by the suction in the central longitudinal passage in the bobbin, the thread being unable to pass around the left or tip end of the spring 178 in Figs. 13 and 14. Wire spring 178 becomes disengaged from the bobbin when the bobbin passes a little beyond the position d, leaving the end of thread still inserted in the longitudinal central passage of the bobbin.

We claim:

1. Bobbin-handling mechanism adapted to receive wound bobbins from textile machines, such bobbins each having a longitudinal passage, including mechanism for causing an air current to enter the longitudinal passage of a bobbin from the tip end of the bobbin, and mechanism acting automatically upon a thread for positioning said thread where said thread is subject to said air current entering the longitudinal passage of the bobbin, so that said thread is thereby drawn into said passage.

2. Bobbin-handling mechanism adapted to receive wound bobbins from textile machines, such bobbins each having a longitudinal passage, including mechanism for applying suction to the longitudinal passage of a bobbin from the base end of the bobbin so as to create an air current entering the longitudinal passage of the bobbin from the tip end of the bobbin, and mechanism acting automatically upon a thread for positioning said thread where said thread is subject to said air current entering the longitudinal passage of the bobbin, so that said thread is thereby drawn into said passage.

3. Bobbin-handling mechanism for textile machines of the kind in which wound bobbins of thread are transferred from winding position onto a bobbin holder, such bobbins each having a longitudinal passage, comprising mechanism acting automatically upon a thread for positioning said thread so as to lie outwardly beyond the tip of a wound bobbin which is part way from winding position to the bobbin holder, and mechanism for inserting said thread into the longitudinal passage of the bobbin from the tip end thereof including means for establishing an air current through said passage.

4. Bobbin-handling mechanism for textile machines of the kind in which wound bobbins of thread are transferred from winding position onto a bobbin holder, such bobbins each having a longitudinal passage, comprising mechanism arranged to cause an air current to enter the longitudinal passage of a bobbin from the tip end thereof as the bobbin is part way from winding position to the bobbin holder, and mechanism acting automatically upon a thread for positioning said thread where said thread is subject to said air current entering the longitudinal passage of the bobbin, so that said thread is thereby drawn into said passage.

5. Bobbin-handling mechanism adapted to receive wound bobbins from textile machines, such bobbins each having a longitudinal passage, including mechanism for causing an air current to enter the longitudinal passage of a bobbin from the tip end of the bobbin, and mechanism acting automatically upon a thread of said bobbin for carrying a portion of said thread to a position where said thread is subject to said air current entering the longitudinal passage of the bobbin, so that said thread is thereby drawn into said passage.

6. Bobbin-handling mechanism adapted to receive wound bobbins from textile machines, such bobbins each having a longitudinal passage, including mechanism for applying suction to the longitudinal passage of a bobbin from the base end of the bobbin so as to create an air current entering the longitudinal passage of the bobbin from the tip end of the bobbin, and mechanism acting automatically upon a thread of said bobbin for carrying a portion of said thread to a position where said thread is subject to said air current entering the longitudinal passage of the bobbin, so that said thread is thereby drawn into said passage.

7. Bobbin-handling mechanism for textile machines of the kind in which wound bobbins of thread are transferred from winding position onto a bobbin holder, such bobbins each having a longitudinal passage, comprising mechanism acting automatically upon a thread of a bobbin for carrying a portion of said thread to a position where it lies outwardly beyond the tip of said bobbin as said bobbin is part way from winding position to the bobbin holder, and mechanism for inserting said thread into the longitudinal passage of said bobbin from the tip end thereof including means for establishing an air current through said passage.

8. Bobbin-handling mechanism for textile machines of the kind in which wound bobbins of thread are transferred from winding position onto a bobbin holder, such bobbins each having a longitudinal passage, comprising mechanism arranged to cause an air current to enter the longitudinal passage of a bobbin from the tip end thereof as the bobbin is part way from winding position to the bobbin holder, and mechanism acting automatically upon a thread of said bobbin for carrying a portion of said thread to a position where said thread is subject to said air current entering the longitudinal passage of said bobbin, so that said thread is thereby drawn into said passage.

9. Bobbin-handling mechanism for textile machines comprising mechanism acting at the conclusion of winding of a textile bobbin to sever the thread extending from a supply to the wound bobbin, such bobbin having a longitudinal passage, and mechanism for subjecting the severed end of thread extending to the wound bobbin to an air current entering the longitudinal passage of said bobbin from the tip end thereof, to insert said severed end into said passage.

10. Bobbin-handling mechanism for textile machines comprising mechanism acting at the conclusion of winding of a textile bobbin to sever the thread extending from a supply to the wound bobbin, such bobbin having a longitudinal passage, and mechanism for subjecting the severed end of thread extending to the wound bobbin to an air current entering the longitudinal passage of the bobbin from the tip end thereof, to insert said severed end into said passage, including a suction conduit arranged to apply suction to the longitudinal passage of the bobbin from the base end thereof so as to create such air current.

11. Bobbin-handling mechanism for textile machines of the kind in which wound bobbins of thread are transferred from winding position onto a bobbin holder, such bobbins each having a longitudinal passage, comprising mechanism acting at the conclusion of winding of a bobbin to sever the thread extending from a supply to the wound bobbin and carry the severed end portion of thread of the bobbin to a position where it lies outwardly beyond the tip of said bobbin as said bobbin is part way from winding position to the bobbin holder, and mechanism for inserting said thread into the longitudinal passage of said bobbin from the tip end thereof including means for establishing an air current through said passage.

12. Bobbin-handling mechanism for textile machines comprising mechanism acting at the conclusion of winding of a textile bobbin to sever the thread extending from a supply to the wound bobbin, such bobbin having a longitudinal passage, mechanism for positioning, outwardly beyond the tip end of the wound bobbin, the severed end of thread that extends to the wound bobbin, and mechanism for creating an air flow into the longitudinal passage of the bobbin from the tip end thereof, to carry the severed end of thread into said longitudinal passage.

13. Bobbin-handling mechanism for textile machines comprising mechanism acting at the conclusion of winding of a textile bobbin to sever the thread extending from a supply to the wound bobbin, such bobbin having a longitudinal passage, mechanism for positioning, outwardly beyond the tip end of the wound bobbin, the severed end of thread that extends to the wound bobbin, and mechanism for applying suction to the longitudinal passage of the bobbin from the base end thereof so as to draw the severed end into said longitudinal passage from the tip end thereof.

14. Bobbin-handling mechanism for textile machines of the kind in which wound bobbins of thread are transferred from winding position onto a bobbin holder, such bobbins each having a longitudinal passage, comprising mechanism for severing the thread extending from a supply to the wound bobbin, mechanism for causing an air current to enter the longitudinal passage of the wound bobbin from the tip end thereof as the bobbin is part way from winding position to the bobbin holder, and mechanism for carrying the severed end of thread attached to the wound bobbin to a position where said thread is subject to said air current entering the longitudinal passage of the bobbin, so that said thread is thereby drawn into said passage.

15. Bobbin-handling mechanism for textile machines of the kind in which wound bobbins of thread are moved from winding position onto a bobbin holder, such bobbins each having a longitudinal passage, comprising mechanism for severing the thread extending from a supply to a wound bobbin and thread-carrying mechanism for carrying the severed end of thread away from winding position, a thread holder adapted to receive the severed end of thread from the thread-carrying mechanism, the path of movement of the bobbin toward the bobbin holder carrying the tip end of the bobbin past said thread holder, and mechanism for applying suction to the longitudinal passage of the bobbin from the base end thereof to draw the thread into said passage from the tip end of the bobbin.

16. Bobbin-handling mechanism for textile machines of the kind in which wound bobbins of thread are moved from winding position onto a bobbin holder, such bobbins each having a longitudinal passage, comprising a cutter and clamp for severing the thread extending from a supply to a wound bobbin and clamping the severed end of thread remaining attached to the bobbin, mechanism for moving the clamp and cutter away from winding position, a suction nozzle adapted to receive the severed end from the clamp and cutter, the path of movement of the bobbin toward the bobbin holder carrying the tip end of the bobbin past said suction nozzle, and mechanism for applying suction to the longitudinal passage of the bobbin from the base end thereof to draw the thread into said passage from the tip end of the bobbin.

17. Bobbin-handling mechanism for textile machines of the kind in which wound bobbins of thread are transferred from winding position onto a bobbin holder, such bobbins each having a longitudinal passage, comprising mechanism arranged to cause an air current to enter the longitudinal passage of a bobbin from the tip end thereof as the bobbin is part way from winding position to the bobbin holder, mechanism acting automatically upon a thread of said bobbin for holding a portion of said thread in a position where said thread is subject to said air current entering the longitudinal passage of said bobbin, and means for releasing the thread from said holding mechanism, so that said thread is drawn by the air current into said passage.

18. In mechanism for inserting an end of thread into the longitudinal passage of a bobbin, the combination of a suction conduit for holding the end of thread outwardly beyond the tip of a bobbin, mechanism for causing a current of air to enter the longitudinal passage of the bobbin from the tip end thereof, and mechanism for reducing the suction in said conduit to facilitate withdrawal of the end of thread therefrom.

19. Bobbin-handling mechanism for textile machines of the kind in which wound bobbins of thread are transferred from winding position onto a bobbin holder, such bobbins each having a longitudinal passage, comprising mechanism arranged to cause an air current to enter the longitudinal passage of a bobbin from the tip end thereof as the bobbin is part way from winding position to the bobbin holder, suction mechanism for holding a portion of the thread of said bobbin in a position where said thread is subject to said air current entering the longitudinal passage of said bobbin, and mechanism for reducing the suction in said suction mechanism, thereby to release said thread, so that said thread is drawn by the air current into said passage.

20. In mechanism for inserting an end of thread into the longitudinal passage of a bobbin, the combination of a suction conduit for holding the end of thread outwardly beyond the tip of a bobbin, a second conduit communicating with the longitudinal passage of the bobbin from the base end thereof, and mechanism for simultaneously applying suction to the second conduit and reducing suction in the first conduit.

21. Bobbin-handling mechanism for textile machines of the kind in which wound bobbins of thread are moved from winding position onto a bobbin holder, such bobbins each having a longitudinal passage, comprising mechanism for severing the thread extending from a supply to a wound bobbin and thread-carrying mechanism for carrying the severed end of thread away from winding position, a thread holder adapted to receive the severed end of thread from the thread-carrying mechanism, the path of movement of the bobbin toward the bobbin holder carrying the tip end of the bobbin past said thread holder, and mechanism for applying suction to the longitudinal passage of the bobbin from the base end thereof to draw the thread into said passage from the tip end of the bobbin, and mechanism for releasing the thread from said holder.

22. Bobbin-handling mechanism for textile machines of the kind in which wound bobbins of thread are moved from winding position onto a bobbin holder, such bobbins each having a longitudinal passage, comprising mechanism for severing the thread extending from a supply to a wound bobbin and thread-carrying mechanism for carrying the severed end of thread away from winding position, a suction nozzle adapted to receive the severed end of thread from the thread-carrying mechanism, the path of movement of the bobbin toward the bobbin holder carrying the tip end of the bobbin past said suction nozzle, mechanism for applying suction to the longitudinal passage of the bobbin from the base end thereof to draw the thread into said passage from the tip end of the bobbin, and mechanism for relieving suction in the suction nozzle to facilitate discharge of the severed end from the suction nozzle to the longitudinal passage of the bobbin.

23. Bobbin-handling mechanism for textile machines of the kind in which wound bobbins of thread are transferred from winding position onto a bobbin holder, such bobbins each having longitudinal passage, comprising thread-carrying mechanism for carrying an end portion of thread of a bobbin to a position where it lies outwardly beyond the tip of said bobbin as said bobbin is part way from winding position to the bobbin holder, said thread-carrying mechanism comprising a clamp and cutter acting to cut the thread extending from a supply to the wound bobbin and acting to clamp the end of thread then remaining attached to the wound bobbin, and mechanism for inserting said end of thread into the longitudinal passage of the bobbin from the tip end thereof including means for establishing an air current through said passage.

24. Bobbin-handling mechanism for traveling spindle multiple-unit winding machines of the kind in which wound bobbins of thread are transferred from the respective winding units onto a bobbin holder, such bobbins each having a longitudinal passage, comprising a movable thread-carrying mechanism comprising a clamp and cutter adapted to lie in an open state in the path of threads of the winding units, said clamp and cutter upon closure cutting the thread extending from a supply to the wound bobbin and clamping the end of thread then remaining attached to the wound bobbin, said clamp and cutter being movable outwardly from the path of the threads of the winding units toward the bobbin holder and being adapted to open in its outer position to release the clamped end of thread, and mechanism for inserting said end of thread into the longitudinal passage of the bobbin from the tip end thereof including means for establishing an air current through said passage.

25. Bobbin-handling mechanism adapted to receive wound bobbins from textile machines, such bobbins each having a longitudinal passage, including mechanism for positioning a thread outwardly beyond the tip of a wound bobbin, a suction nozzle arranged to hold the thread in such position, and mechanism for inserting said thread into the longitudinal passage of the bobbin from the tip end thereof including means for establishing an air current through said passage.

26. Bobbin-handling mechanism adapted to receive wound bobbins from textile machines, such bobbins each having a longitudinal passage, including mechanism acting at the conclusion of winding of a textile bobbin to sever the thread extending from a supply to the wound bobbin, mechanism for carrying the severed end of thread attached to the bobbin to a position outwardly beyond the tip of said bobbin, a suction nozzle arranged to hold the thread in such position, and mechanism for inserting said end of thread into the longitudinal passage of said bobbin from the tip end thereof including means for establishing an air current through said passage.

27. Bobbin-handling mechanism for textile machines of the kind in which wound bobbins of thread are transferred from winding position onto a bobbin holder, such bobbins each having a longitudinal passage, comprising a clamp and cutter acting to cut the thread extending from a supply to the wound bobbin and acting to clamp the end of thread then remaining attached to the wound bobbin, a suction nozzle arranged to hold the thread outwardly from the tip of the bobbin as said bobbin is part way from winding position to the bobbin holder, the clamp and cutter being movable to carry the end of thread to said nozzle, and mechanism for inserting said end of thread into the longitudinal passage of said bobbin from the tip end thereof including means for establishing an air current through said passage.

28. In bobbin-handling mechanism of the kind having a guide surface arranged to support the bases of bobbins during transfer thereof from winding position toward a bobbin holder, such bobbins each having a longitudinal passage, a suction connection opening through said guide surface in position to communicate with the longitudinal passage of a bobbin supported on said guide surface, thereby to cause a current of air to enter the longitudinal passage of the bobbin from the tip end, and mechanism for presenting a thread to said air current so that said thread is thereby drawn into said passage.

29. Bobbin-handling mechanism adapted to receive wound bobbins from textile machines, such bobbins each having a longitudinal passage, including mechanism for inserting the thread of a bobbin into the longitudinal passage of said bobbin including means for establishing an air current through said passage, a member engageable with the bobbin to restrain the thread from unwinding therefrom, and mechanism for withdrawing said member from the bobbin.

30. Bobbin-handling mechanism adapted to receive wound bobbins from textile machines, such bobbins each having a longitudinal passage, including mechanism for inserting the thread of a bobbin into the longitudinal passage of said bobbin including means for establishing an air current through said passage, a member positioned to intervene between the bobbin and the thread during such insertion of the thread, and mechanism for withdrawing said member from between the thread and bobbin.

31. Bobbin-handling mechanism adapted to receive wound bobbins from textile machines, such bobbins each having a longitudinal passage, including mechanism for causing an air current to enter the longitudinal passage of the bobbin from the tip end of the bobbin, mechanism for carrying a portion of the thread of the bobbin to a position where such thread is subject to said air current entering the longitudinal passage of the bobbin so that said thread is thereby drawn into said passage, and a member engageable with the bobbin to restrain the thread from unwinding therefrom under the influence of the air current.

32. Bobbin-handling mechanism adapted to receive wound bobbins from textile machines, such bobbins each having a longitudinal passage, including mechanism for causing an air current to enter the longitudinal passage of the bobbin from the tip end of the bobbin, mechanism for carrying a portion of the thread of the bobbin to a position where such thread is subject to said air current entering the longitudinal passage of the bobbin, a member positioned to intervene between the bobbin and the thread, the thread being drawn into said passage by said air current while said member is between the thread and bobbin, and mechanism for withdrawing said member from between the thread and bobbin.

33. Bobbin-handling mechanism for textile machines of the kind in which wound bobbins of thread are transferred from winding position onto a bobbin holder, such bobbins each having a longitudinal passage, comprising mechanism arranged to cause an air current to enter the longitudinal passage of a bobbin from the tip end thereof as the bobbin is part way from winding position to the bobbin holder, mechanism for carrying a portion of the thread of said bobbin to a position where said thread is subject to said air current entering the longitudinal passage of said bobbin so that said thread is thereby drawn into said passage, and a member positioned to engage the bobbin at such part way position to restrain the thread from unwinding from the bobbin, the subsequent stage of transfer of the bobbin from such part way position toward the bobbin holder then withdrawing said member from between the thread and bobbin.

WINTHROP L. PERRY.
JOSEPH E. RING.

References Cited in the file of this patent
UNITED STATES PATENTS

| Number | Name | Date |
|---|---|---|
| 2,208,930 | Kohlisch | July 23, 1940 |
| 2,426,167 | Abbott et al. | Aug. 26, 1947 |
| 2,429,330 | Roberts | Oct. 21, 1947 |
| 2,460,736 | Drake | Feb. 1, 1949 |